United States Patent [19]

Ply

[11] 4,116,491
[45] Sep. 26, 1978

[54] TUBULAR PNEUMATIC CONVEYOR PIPELINE

[76] Inventor: Lemuel Leslie Ply, Rte. 1, Box 354 E, Wimberley, Tex. 78676

[21] Appl. No.: 796,491

[22] Filed: May 12, 1977

Related U.S. Application Data

[63] Continuation-in-part of Ser. No. 638,114, Dec. 15, 1978, abandoned.

[51] Int. Cl.² .................................................. B65G 53/18
[52] U.S. Cl. ........................................ 302/29; 302/51; 302/64
[58] Field of Search .................. 302/21, 25, 51, 57, 302/29, 24, 35, 64; 138/114; 137/13, 571

[56] References Cited

U.S. PATENT DOCUMENTS

| 982,923 | 1/1911 | Barby | 302/51 |
|---|---|---|---|
| 1,139,091 | 5/1915 | Weber | 302/51 |
| 1,309,671 | 7/1919 | Weaver | 302/57 |
| 3,040,760 | 6/1962 | Macks | 302/29 |

FOREIGN PATENT DOCUMENTS

| 1,164,957 | 10/1958 | France | 302/29 |
|---|---|---|---|
| 578,373 | 5/1933 | Fed. Rep. of Germany | 302/64 |
| 1,101,052 | 1/1968 | United Kingdom | 302/64 |
| 680,460 | 10/1952 | United Kingdom | 302/29 |

*Primary Examiner*—Bruce H. Stoner, Jr.
*Assistant Examiner*—Jeffrey V. Nase
*Attorney, Agent, or Firm*—Michael P. Breston

[57] ABSTRACT

A pneumatic tubular conveyor pipeline is provided for conveying solid products for example in granular or chunk form. The conveyor pipeline comprises an outer impervious pipe and an inner porous pipe arranged so as to form an annulus therebetween. The annulus is divided into chambers having unidirectional pressure responsive vents. An air pressure source is connected to the first chamber. A feed apparatus is connected to the feed end of the inner pipe for injecting the product into and propelling same through the inner pipe. The chambers' vents consecutively open as the underlying portions of the inner pipe become filed with the product.

6 Claims, 11 Drawing Figures

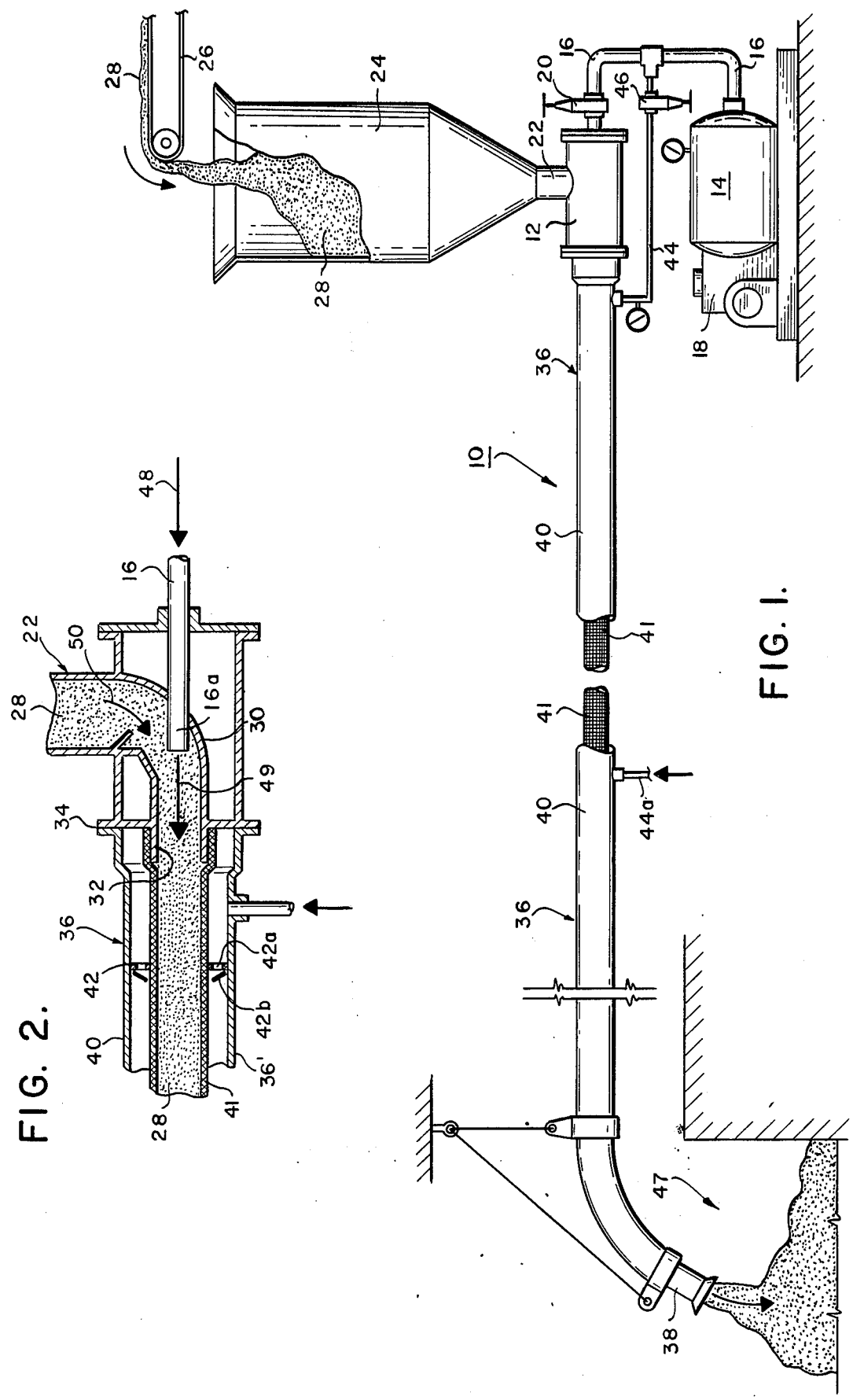

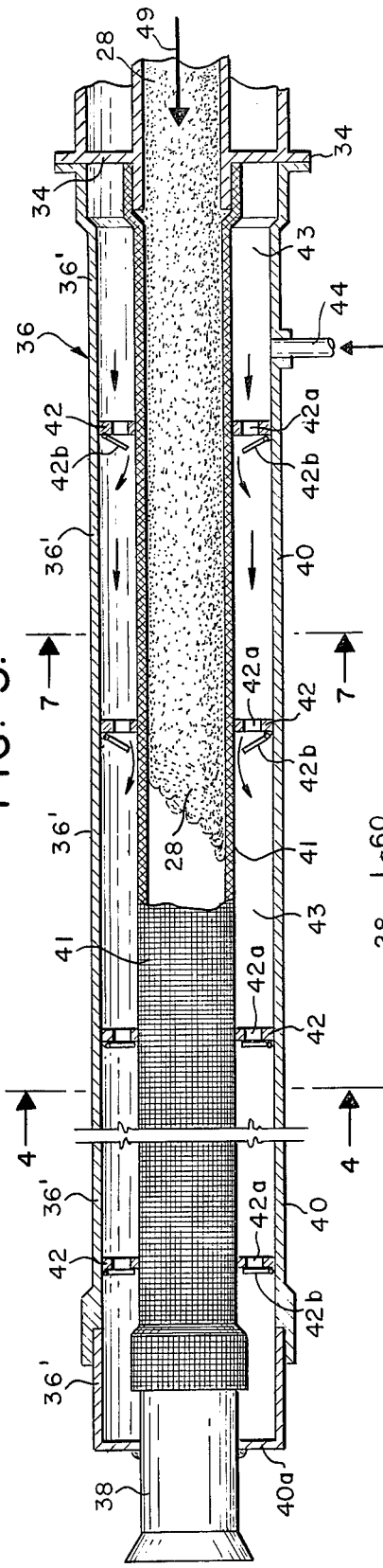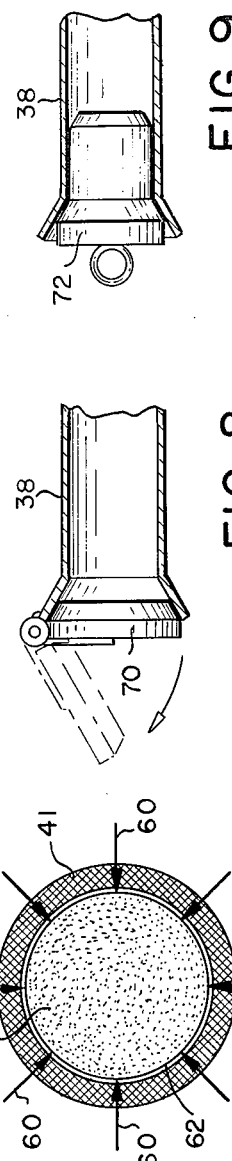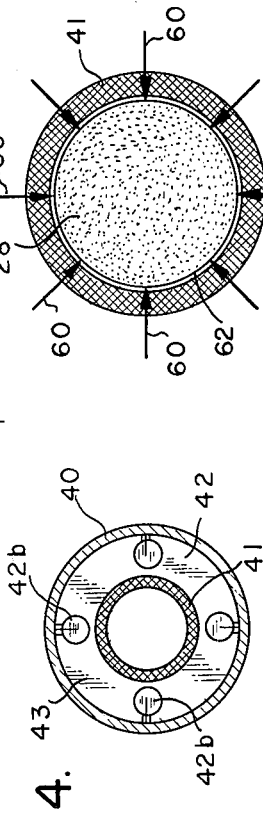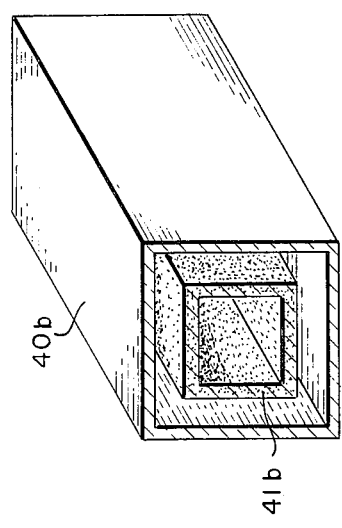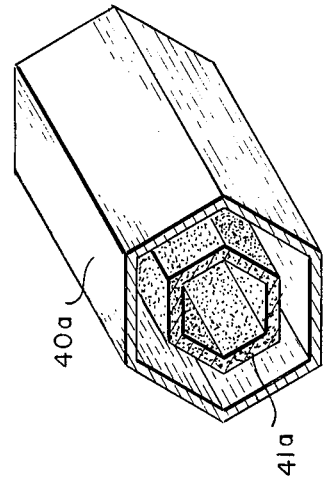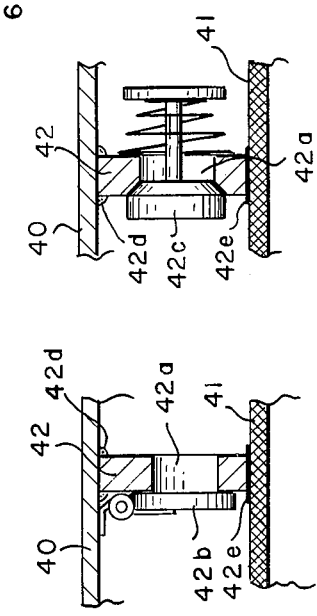

TUBULAR PNEUMATIC CONVEYOR PIPELINE

REFERENCE TO RELATED APPLICATION

This application is a continuation-in-part of my copending application Ser. No. 638,114, filed on Dec. 15, 1975 and now abandoned.

BACKGROUND OF THE INVENTION (a) Field of the Invention

This invention relates to pneumatic conveyor systems for conveying substantially dry materials over very long distances.

(b) Description of the Prior Art

Conventional pneumatic pipe conveyor systems transport materials in suspension by means of a high-velocity air stream. The principal uses for such pipe conveyor systems are for the transport of materials such as granular cork, bran, carbon black, copra, grain, wood chips, and saw dust. One such known system for transporting pulverized materials consists of a motor-driven pump and of a source of compressed air for fluidizing the material. The material itself is fed from a bin or hopper into a pump mechanism which is of the screw type. Compressed air is admitted from a cylindrical manifold into the discharge end of the screw, thus changing the material into a semi-fluid substance before allowing it to enter the transport line. The greatest present use of such a system is believed to be for transporting bulk cement.

Such a system is obviously restricted as to the types of materials that can be transported, especially over long distances. Since this system depends upon suspension of the materials in a high-velocity air stream, serious limitations are imposed due to pressure drop especially over long distances. Heavier materials fall out of the air stream and gradually cause pressure surges and clogging of the transport duct. As would be expected, the known systems operate more efficiently through straight runs and do not easily tolerate sharp bends and vertical sections.

Due to the required high-velocity air stream, the conventional systems also create severe dust problems at the discharge end of the conduit, thus requiring dust collectors which add to the expense of the system. Even the suction type of pneumatic conveyor also requires a dust collector at its discharge end.

Various other conveyor systems have been proposed in the patent literature, such as a pipeline having an impervious outer pipe and a porous inner pipe. However, the initial leakage of air pressure from and through the entire annulus into the porous transport pipe places a severe limitation on the length of the pipeline that can be used. For this reason such proposed systems have not been commercially acceptable.

SUMMARY OF THE INVENTION

The present invention utilizes a conveyor pipeline comprising a porous inner pipe, which is the product-carrying pipe, and an outer pipe, which is gas impervious and forms a housing about the inner pipe. The outer pipe is closed about the inner pipe adjacent each of its ends. An air pressure source is connected to the annulus formed between the pipes. Air-tight support baffles are placed at predetermined distances between the pipes. The baffles form chambers along the length of the annulus between the pipes. One-way pressure relief valves in each baffle open, in the direction of product flow, only when the underlying portion of the inner pipe becomes filled with the product. The air pressure from the annulus chamber flows through the porous inner pipe, whereby a 360° annular air cushion is formed on which the conveyed product can float with little resistance. Relatively-low air pressure can transport large amounts of product over long distances and in relatively short time intervals.

In one embodiment, the throat of a feed hopper was connected into the inner porous pipe. One end of an air jet pipe extended into the throat and projected a short distance into the porous inner pipe. The other end of the jet pipe was connected to an air compressor. As air is jetted into the porous pipe, the formed suction draws product from the hopper, past the end of the jet, and forces it into the porous pipe. As more and more product is being forced into the porous pipe, the product gradually forms a mass against which the air pressure from the jet pipe can push and move it through the porous pipe. The air entering from the annulus chamber into the inner pipe tends to form a 360° air cushion about the product, thus greatly reducing friction and allowing relatively-low air pressure to propel the product. The chambers' valves consecutively open in the direction of flow as the underlying portions of the inner pipe become filled with the product.

BRIEF DESCRIPTION OF THE DRAWINGS

FIG. 1 is a schematic view of a pneumatic conveyor system incorporating the pipeline of this invention;

FIG. 2 is a sectional view showing the connection of the pipeline to a product feed apparatus;

FIG. 3 is a sectional, longitudinal view of the structure of the pipeline;

FIG. 4 is a view taken on line 4—4 in FIG. 3;

FIG. 5 is an enlarged fragmentary view showing one type of valve used in each baffle;

FIG. 6 is similar to FIG. 5 but showing another type of valve;

FIG. 7 is a sectional view taken along line 7—7 in FIG. 3 showing the air cushion formed about the conveyed product;

FIGS. 8 and 9 show means for plugging the discharge end of the pipeline; and

FIGS. 10 and 11 illustrate other configurations for the pipeline.

DESCRIPTION OF THE PREFERRED EMBODIMENTS

The pneumatic conveyor system, generally designated as 10 (FIGS. 1-3), is coupled to an injection housing 12 which is connected to a compressor tank 14 by a pipe 16 containing a regulator 20. Tank 14 is pressure charged by an air compressor 18. A throat 22 connects housing 12 to the lower end of a feed hopper 24 containing a granular product 28 which is supplied to the hopper by a belt conveyor 26. The lower end 30 of throat 22 is elbow shaped with its open end 32 extending laterally from housing 12.

Connected to housing 12 by a flange 34 is a transport pipeline, generally designated as 36, having a discharge end 38. Pipe 16 extends into the elbow section 30 with its open end 16a being coaxially aligned with the open end 32 of throat 22.

Pipeline 36 consists of an impervious outer pipe 40 and a porous inner pipe 41 which is concentrically mounted in pipe 40 on spaced-apart support baffles 42. Each baffle is welded to outer pipe 40 at 42d (FIG. 5)

and to inner pipe 41 at 42e. Between pipes 40, 41 and each pair of baffles is thus formed a pipeline section 36' having an annulus chamber 43. The first section 36' is closed at its inlet end by flange 34, and the last section 36' is closed by a transverse wall 40a (FIG. 3).

A pipe 44 containing a pressure regulator 46 connects the first pipeline section 36' to pipe 16. Each baffle 42 contains a plurality of angularly-spaced, unidirectional, pressure-responsive control vents 42a. Each vent can comprise a spring-biased, one-way pressure-relief valve 42b (FIG. 5) or 42c (FIG. 6). All the valves are biased in the same direction and by the same amount. Air pressure can also be injected into a downstream chamber 43 through an auxiliary pipe 44a.

When a granular product 28 is to be conveyed by pipeline 36 from hopper 24 to a remote storage 47, an air stream, designated by arrow 48 (FIG. 2), is made to flow through pipe 16 to form an air jet 49 through the open end 32 of throat 22. This air jet 49 draws the product from hopper 24 in the direction of arrow 50 and jets it into the porous inner pipe 41. When a sufficient mass of the product is injected into pipe 41, the product forms a mass against which the air pressure from pipe 16 can be exerted.

Simultaneously, the air pressure from pipe 44 continuously fills the annulus chamber 43 of the first pipeline section 36'. As the product moves to the left in the direction 49, the pressure in the first chamber 43 of the first pipeline section 36' builds up and reaches a level such as to overcome the spring resistance of the valves 42b or 42c in the vents 42a, thereby causing the vents to open. The open vents 42a now allow the annulus chamber 43 of the next or second pipeline section 36' to become fully pressurized. This process will be repeated until all the chambers 43 becomes progressively pressurized. When the chamber 43 in the last pipeline section 36' has its vents 42a open, the product will be discharging through the pipeline's discharge end 38. It will be apparent, that in accordance with this invention, the next chamber 43 will not pressurize unless the preceeding chamber is fully pressurized and the preceeding section 36' is fully loaded with the product 28.

FIG. 7 schematically illustrates by arrows 60 how air penetrating porous pipe 41 forms a continuous air cushion 62 about the entire periphery of the grannular mass of product 28.

As the product moves through the porous inner pipe 41, it is supported by the air cushion 62 produced by each pressurized pipeline section 36'. Eventually the product will begin to discharge from the discharge end 38. Since air is being continuously lost through the porous pipe 41, air pressure must be continuously supplied to the annulus chamber 43 of the first pipeline section 36'.

It may be desirable to stop whatever air pressure loss there may be through discharge end 38 until inner pipe 41 is substantially completely filled with the product 28. For this purpose a spring-loaded door 70 (FIG. 8) is attached to discharge end 38. Door 70 will open automatically under sufficient pressure from the product 28 after it fills the inner pipe 41. A simple plug 72 (FIG. 9) may be used instead of door 70 to be manually removed at the proper time. Stop members 70 or 72 also allow the discharge end 38 to be closed when the pipeline is not in use, thereby preventing condensation from forming inside pipeline 36.

It has been found that with the sectionalization of the pipeline 36 in sections 36', the stop members 70 or 72 are not essential, as the vents 42a considerably reduce the air leakage through the inner porous pipe 41. The stop members 70 or 72 are useful, however, in preventing moisture condensation in the pipeline when not in use.

The pipeline 36 has been described in connection with cylindrical pipes. However, as will be understood by those skilled in the art, pipes 40, 41 may be formed in various other configurations, such as square pipes 40a, 41a (FIG. 11), or hexagonal pipes 40b, 41b (FIG. 10). The outer pipe in each case may be formed of a metal or a plastic material. The porous construction of the inner pipe 41 is such that air can enter into the inner pipe, but the product cannot pass through the porous material into an annulus chamber 43.

By suitably designing the pore sizes in the inner pipe 41, large granular or chunk products such as ore, coal, etc., may be transported by the pipeline 36. The pipeline can also be adapted for the transportation of large packages at high rates of speed, and for the transportation of products at elevated temperatures.

Since the pipeline in accordance with the invention requires no high-velocity air stream, and since the pressure used is a pushing force, the dust problem of conventional systems is greatly reduced.

Moreover, the pipeline of this invention can transport heavy products through straight as well as through bends and vertical sections. The products can be cold or at elevated temperatures.

As will be readily appreciated from the above description, when taken in conjunction with the drawings, the present invention provides a conveyor system which is efficient, time saving, and which greatly reduces the problems encountered in conventional pneumatic conveyor systems.

What is claimed is:

1. An apparatus for conveying a solid product, comprising:
 a conveyor pipeline having an outer impervious pipe and an inner porous pipe radially spaced therefrom to form an annulus therebetween from the upstream end of the pipeline to the downstream end of the pipeline;
 first and second end walls between said inner and outer pipes, said inner pipe receiving at the upstream end thereof a propelled solid product which is conveyed by said inner pipe to the downstream end thereof;
 longitudinally spaced divider means between said inner and outer pipes dividing said annulus into a plurality of chambers;
 each divider means having at least one uni-directional pressure-responsive vent, each vent being biased to open in the downstream direction; and
 a gas inlet fluidly connected to the upstream portion of said annulus for receiving pressurized gas.

2. The apparatus of claim 1, and feed means connected to said upstream end of said inner pipe for injecting a solid product into said inner pipe, said feed means including:
 a product feed hopper,
 an elbow-shaped pipe connecting said inner pipe to said feed hopper,
 a jet-pipe having one end thereof projecting through said elbow-shaped pipe whereby air pressure admitted through said jet-pipe draws product from said hopper and propels the product into and through said inner pipe; and a gas pressure source connected to and feeding gas into said gas inlet for providing a gas cushion for said solid product transported by said inner pipe.

3. The pipeline of claim 1, wherein said pressure responsive vent includes a one-way pressure relief valve.

4. The apparatus of claim 1 wherein the vents in consecutive dividers open progressively in the downstream direction at a rate determined by the product flow through said inner pipe.

5. The conveyor apparatus of claim 4 wherein said pressurized gas from each annular chamber forms an annular air cushion around the product conveyed by the inner pipe.

6. A pneumatic conveyor pipeline, comprising:
an impervious outer pipe,
a concentric, porous inner pipe for conveying solid products therethrough,
axially spaced-apart baffles supporting said inner pipe, and each consecutive pair of said baffles forming an annular chamber therebetween,
a gas inlet fluidly connected to an upstream annular chamber for receiving pressurized gas from a gas pressure source, thereby providing a gas cushion for said solid products conveyed through said inner pipe, and
at least one unidirectional pressure relief valve in each baffle, each valve being biased to open in the downstream direction of product flow.

* * * * *